(12) United States Patent
Sikorski

(10) Patent No.: US 8,503,857 B2
(45) Date of Patent: Aug. 6, 2013

(54) RECORDABLE DOWNLOADABLE VIDEO AUDIO WEDDING AND PHOTO ALBUM AND ACCESSORIES

(76) Inventor: Edward Sikorski, Mineola, NY (US)

(*) Notice: Subject to any disclaimer, the term of this patent is extended or adjusted under 35 U.S.C. 154(b) by 78 days.

(21) Appl. No.: 13/232,439

(22) Filed: Sep. 14, 2011

(65) Prior Publication Data

US 2012/0321272 A1 Dec. 20, 2012

Related U.S. Application Data

(60) Provisional application No. 61/497,848, filed on Jun. 16, 2011, provisional application No. 61/498,366, filed on Jun. 17, 2011.

(51) Int. Cl.
*H04N 5/77* (2006.01)
(52) U.S. Cl.
USPC .......................................................... 386/224
(58) Field of Classification Search
USPC .................. 348/157; 386/224, 230; 40/124, 40/725; 715/700
See application file for complete search history.

(56) References Cited

U.S. PATENT DOCUMENTS

| | | | |
|---|---|---|---|
| 7,840,898 B2 | 11/2010 | Hua et al. | |
| 2008/0043259 A1 | 2/2008 | Triplett et al. | |
| 2008/0046818 A1* | 2/2008 | Orgill et al. | 715/700 |
| 2009/0235563 A1* | 9/2009 | Lehrman | 40/124.03 |
| 2010/0052306 A1* | 3/2010 | Teicher | 281/45 |
| 2010/0052934 A1* | 3/2010 | Clegg et al. | 340/815.4 |
| 2010/0164836 A1* | 7/2010 | Liberatore | 345/1.1 |
| 2010/0250255 A1 | 9/2010 | Stern | |
| 2011/0066945 A1 | 3/2011 | Lee et al. | |
| 2011/0210160 A1* | 9/2011 | Vantieghem | 229/68.1 |
| 2011/0267773 A1* | 11/2011 | Macfarlane | 361/679.55 |
| 2011/0297566 A1* | 12/2011 | Gallagher et al. | 206/320 |
| 2012/0106047 A1* | 5/2012 | Chu et al. | 361/679.01 |
| 2012/0279104 A1* | 11/2012 | Marino | 40/725 |

\* cited by examiner

*Primary Examiner* — Thai Tran
*Assistant Examiner* — Stephen Smith
(74) *Attorney, Agent, or Firm* — RG Patent Consulting LLC

(57) ABSTRACT

A system to record videos and take still photographs of special events, which can be placed into a photo album; the electronic recording and video displaying device as a tablet being preferably built into the cover of the album. The system allows consumers to view segments of their weddings while looking through their wedding photos. Further, the electronic recording and video displaying device can be removed from the photo album and connected to a charger or hooked up to a computer for downloading event footage such as that of a wedding. Users may erase the recorded video and replace it with new footage or an entity may control content. Alternate embodiments may be placed into a corresponding box or a card as a remote means for sending personalized greetings.

20 Claims, 5 Drawing Sheets

RECORDABLE DOWNLOADABLE VIDEO AUDIO WEDDING AND PHOTO ALBUM AND ACCESSORIES

CROSS-REFERENCE TO RELATED APPLICATION

The present application is related to and claims priority from prior provisional applications Ser. No. 61/497,848, filed Jun. 16, 2011 and 61/498,366, filed Jun. 17, 2011 and which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of photo storage devices and more specifically relates to a photo storage system that is capable of displaying event photographs in still and non-still means.

2. Description of the Related Art

Individuals in modern society often partake in momentous events for special occasions. Often these individuals wish to capture the events of these occasions on some form of media that may be viewed at a future time. One form of traditional media is photographs. Photographs may come in digital formats and non-digital formats. A photograph is an image created by light falling on a light-sensitive surface, usually photographic film or an electronic imager such as a CCD or a CMOS chip. Most photographs are created using a camera, which uses a lens to focus the scene's visible wavelengths of light into a reproduction of what the human eye would see. Photographs may be susceptible to damage from handling and environmental factors. For example photographs that are sent in cards may become warped or damaged in the mail, and pictures or videos that are sent via e-mail cannot typically be displayed in highly visible areas around the recipient's home. It is desirable that photographs be protected and visible for guests to view.

Organizing photos in albums is a customary practice, particularly after weddings and other special events have occurred. A photographic album, or photo album, is a collection of photographs, generally kept in a book. Some albums have compartments which the photos may be slipped into; other albums have heavy paper with an abrasive surface covered with clear plastic sheets, in which photos can be put. Older style albums often were simply books of heavy paper which photos could be glued to or attached to with adhesive corners, or pages. Keeping photographs in albums may help to ensure that the pictures are somewhat protected from damage, and may keep all photos related to specific events in one centralized and accessible location. However, there may be no way to store video recordings of these corresponding events in a similar fashion. Consumers may wish to keep all photographs and videos relating to specific events in one place so that the videos and pictures may be viewed at one time.

Further, many consumers send gifts for birthdays, graduations, and other occasions to loved ones. These gifts are often embellished with attractive wrapping and cards displaying thoughtful messages. However, these items may not be personal enough to truly show the sender's affections. Additionally, recipients may wish to see and hear their loved ones, which cannot be accomplished with conventional gifts and cards. A need exists for a simplified system whereby still and non-still photographs may be organized and readily viewable by individuals.

Various attempts have been made to solve the above-mentioned problems such as those found in U.S. Pat. And Pub. Nos. 2010/0164836; 2008/0043259; 2010/0052306; 7,840,898; 2010/0250255; and 2011/0066945. This prior art is representative of photo storage devices. None of the above inventions and patents, taken either singly or in combination, is seen to describe the invention as claimed.

Ideally, a video/audio and photo album and accessories system should be user-friendly and versatile, yet would operate reliably and be manufactured at a modest expense. Thus, a need exists for a reliable recordable downloadable video audio wedding and photo album to store photographs, to record videos, which can be usable as a novel multi-media display photo album and/or as a greeting means and to avoid the above-mentioned problems.

BRIEF SUMMARY OF THE INVENTION

In view of the foregoing disadvantages inherent in the known digital photo album art, the present invention provides a novel recordable downloadable video audio wedding and photo album and accessories system. The general purpose of the present invention, which will be described subsequently in greater detail is to provide storage for still photographs and an electronic means to record videos, which can be placed on display in a specialty album or sent as a greeting in a card.

The recordable downloadable video audio wedding and photo album and accessories of the present invention allows consumers to view segments of their special events at future dates. The recordable downloadable video audio wedding and photo album in a preferred embodiment as disclosed herein preferably features a photo album containing an electronic recording device (a tablet) preferably built into the cover. Further, the photo album in its versatile nature can be removed and connected to a charger or hooked up to a computer for downloading wedding footage to be viewed or transmitted online for others to see.

In certain embodiments users may also erase the recorded video and replace it with new footage as desired; however in preferred embodiments the entity selling or otherwise controlling (licensing/renting, etc.) the product downloads the contents onto the album for the end user. This recordable downloadable video audio wedding and photo album can also be used for storage of birthday, graduation, and family photographs or may be placed into a corresponding box or card as a form of greeting a remote recipient. Users may also record themselves sending well-wishes and congratulatory messages, and then place the device into the card or box containing a gift. Recipients can then remove the device to play the messages, and may place the device on a table, refrigerator, or other highly-visible location within the home. In this way the present invention is versatile in use, aesthetic and highly visible.

The present video/audio and photo album and accessories system as disclosed herein preferably comprises a photo album for storing a plurality of still-pictures; an electronic recording and video displaying device (a tablet); at least one USB port; and a securer. The photo album has a front cover, a rear cover, a spine and at least one still-picture-storing-page (preferably a plurality of pages may be used for suitable storage space to memorialize the event(s).) The still pictures and the recorded videos may be of a wedding event, birthday event, graduation event, and/or a family event, and in alternate embodiments may comprise greetings. The video/audio and photo album and accessories system provides individuals with a convenient means by which to simultaneously view the plurality of still pictures and the recorded videos in one event memorabilia assembly.

The electronic recording and video displaying device is preferably located on a face of the front cover of the photo album in preferred embodiments. The electronic recording and video displaying device (as a tablet) is able to be permanently or removably attached to the front cover of the photo album (and may be attached to or detached from the included wiring.) Tablet preferably comprises touch screen capabilities and uses icons as developed by the inventor including for example: pre-ceremony; ceremony; bride and groom at the Church; ring exchange; picture(s) scrolling; exiting the Church; and the like. The wedding planner/photographer or individuals with permission may upload all or some of the desired pictures and/or video to the tablet. In certain embodiments other individuals may remove the electronic recording and video displaying device out of the front cover to record or erase footage, thereby providing a means of personalized communication and recording of the 'spirit' of the event. Further, the electronic recording and video displaying device comprises a camera lens (to input data), at least one display screen, and at least one speaker (to output data.) The tablet (electronic recording and video displaying device) may be embedded into the album cover or may be placed in a form-fitting sleeve (slides in and out) in alternate embodiments. Additionally, the tablet may be used in other applications such as on or in conjunction with binders for presentation or promotion purposes.

The electronic recording and video displaying device and the USB port are removably connected in electrical communication with each other. The USB port(s) is located preferably in the spine of the photo album and this USB port may be used in charging the electronic recording and video displaying device and/or connecting the electronic recording and video displaying device to at least one computer for downloading and/or uploading recorded videos and/or data onto the computer (to the internet or the like.)

Further, the electronic recording and video displaying device comprises a securer in alternate embodiments such that when the device is sent as a personalized greeting means the greeting may be displayed on at least one vertical surface. The securer comprises an adhesive, a hook and loop fastener, or a magnet (or suitable equivalent) such that it may be suitably affixed in place for viewing. In a further embodiment the tablet may be embedded into a picture frame; wherein the frame may be hanged on a wall or other vertical surface or placed on an easel or an easel bracket may alternately be attached to the picture frame.

A kit is embodied herein for the video/audio and photo album and accessories system comprising: the photo album (with a plurality of photograph storing pages); the electronic recording and video displaying device; and at least one securer. The photo album in alternate embodiments may comprise no (inner) pages in certain embodiments, only a front and back page (cover) and comprise a greeting card as used for sending personalized greetings remotely via mail or other.

In accordance with the embodiments of the present invention a preferred method of use is disclosed herein comprising: inserting an electronic recording and video displaying device into a front cover of a photo album of an event memorabilia assembly; removing the electronic recording and video displaying device from the front cover; video and audio recording at least one event; placing still-pictures of the at least one event into still-picture-storing-pages; and viewing the video and audio recording and the still-pictures of the at least one event at at least one future date.

The present invention holds significant improvements and serves as a recordable downloadable video audio wedding and photo album and accessories system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, recordable downloadable video audio wedding and photo album and accessories system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a digital photo album device and more particularly to a recordable downloadable video audio wedding and photo album and accessories system to provide means to store still photographs, to record videos (non-still photographs; events in action), and for displaying via the electronic recording device preferably built into the cover. In the following ways the present invention provides a user-friendly and convenient means for recording, storing and displaying memorabilia.

Figure 1:
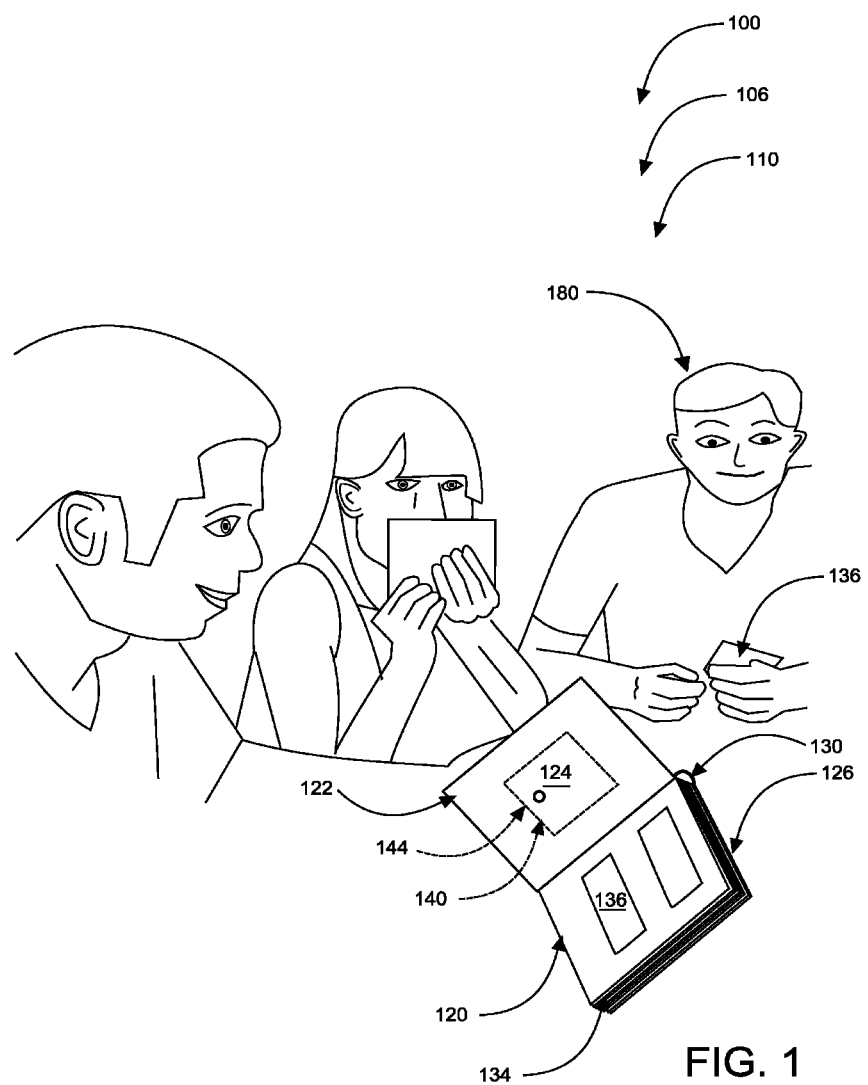
FIG. 1 shows a perspective view illustrating a photo album and an electronic recording and video displaying device of a video/audio and photo album and accessories system in an in-use condition according to an embodiment of the present invention.
Figure 2:
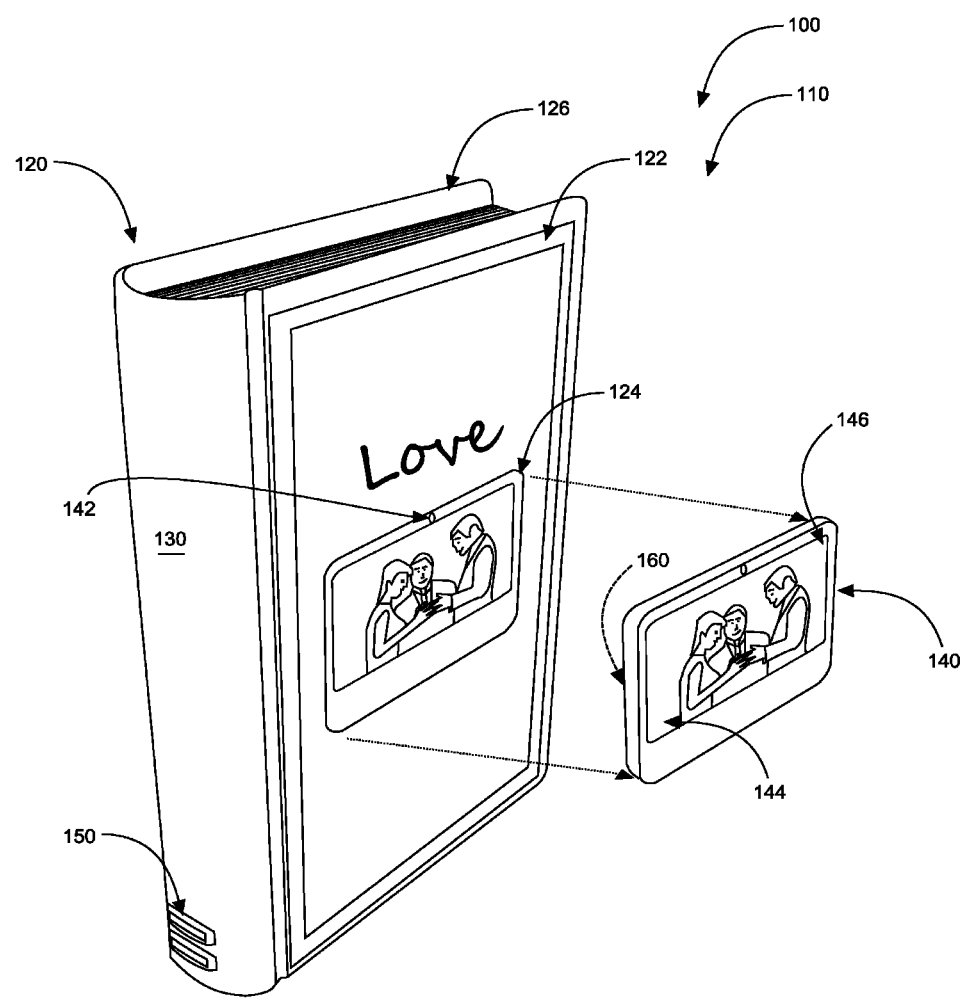
FIG. 2 is a perspective view illustrating the electronic recording and video displaying device as removable from the photo album (cover) according to an embodiment of the present invention of FIG. 1.
Figure 3:
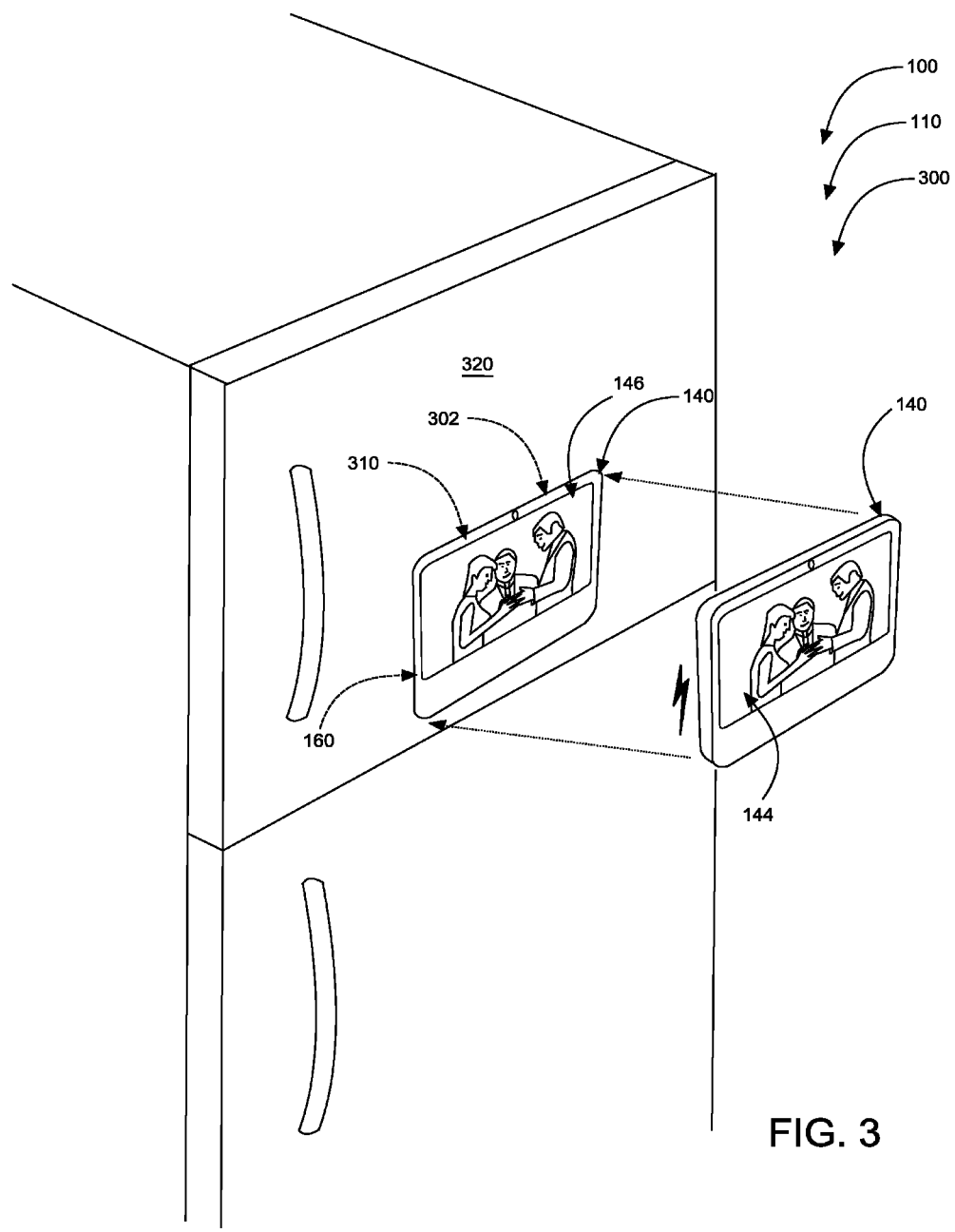
FIG. 3 is a perspective view illustrating the video/audio and photo album and accessories system used as a greeting means according to an alternate embodiment of the present invention.

Referring more specifically to the drawings by numerals of reference in FIGS. 1-3, there is shown in FIG. 1 a perspective view illustrating photo album 120 and electronic recording and video displaying device 140 of video/audio and photo album and accessories system 110 in 'in-use' condition 106. FIG. 2 illustrates electronic recording and video displaying device 140 as removable from photo album 120 and FIG. 3 showing a perspective view illustrating video/audio and photo album and accessories system 110 used as a greeting means according to an alternate embodiment of the present invention of FIG. 1.

Recordable downloadable video audio wedding and photo album and accessories 100 provides consumers with a convenient way to simultaneously view plurality of still-pictures 136 and recorded videos 144 taken at special event(s). Recordable downloadable video audio wedding and photo album and accessories 100, as shown in FIGS. 1 and 2, preferably comprises video/audio and photo album and accessories system 110. Video/audio and photo album and accessories system 110 preferably comprises photo album 120 for storing still-pictures 136; electronic recording and video displaying device 140; and at least one USB port 150. Photo album 120 preferably has front cover 122, rear cover 126, spine 130; and a plurality of still-picture-storing-pages 134. Still-picture-storing-pages 134 preferably removeably-store still-pictures 136. Still-pictures 136 removeably stored on still-picture-storing-pages 134 may be of a wedding event, a birthday event, a graduation event, or a family event.

Electronic recording and video displaying device 140 is preferably located on face 124 of front cover 122 of photo album 120 such that it is both aesthetically appealing and easily viewable (for display.) Electronic recording and video displaying device 140 may be permanently built into (attached) to front cover 122 of photo album 120. However, electronic recording and video displaying device 140 may also be removably attached to front cover 122 of photo album 120 (as shown in FIG. 2) via fasteners 160 such as a hook and loop fasteners or the like (shown in FIG. 4.) and may be removed via finger-pushing tablet through the aperture shown on the back portion of front cover 122 of photo album 120 (FIG. 1.) Upon reading this specification, it should be appreciated that, under appropriate circumstances, considering such issues as user preferences, design preference, structural requirements, marketing preferences, cost, available materials, technological advances, etc., other fastener arrangements such as, for example, adhesives, magnets etc., may be sufficient such as those used in FIG. 3.

Figure 4:
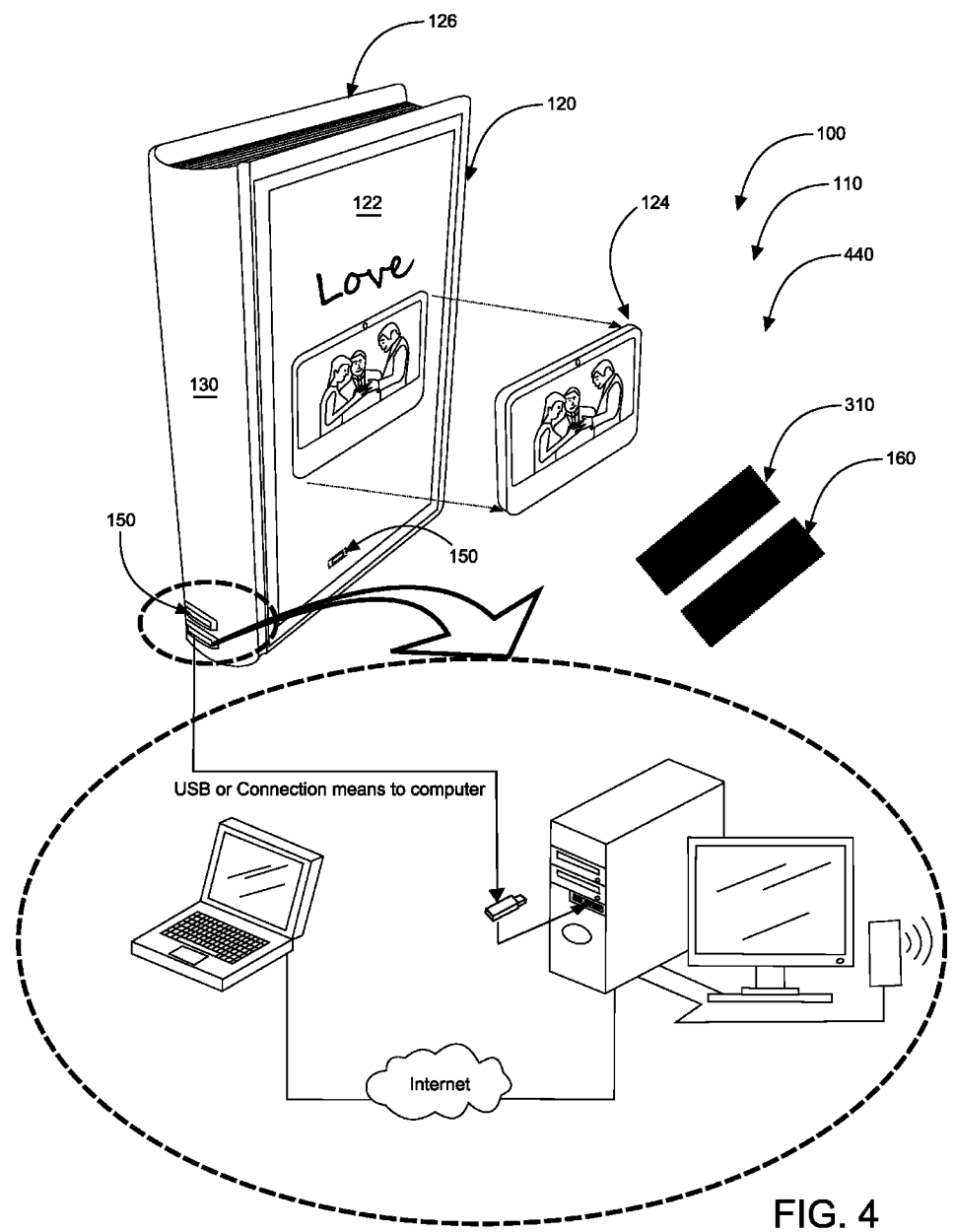
FIG. 4 is a perspective view illustrating a kit and a means for communicating/downloading and uploading of event media according to an embodiment of the present invention of FIG. 1.

Electronic recording and video displaying device 140 and USB port 150 are preferably removably connected in electrical communication with each other; electrical communication wiring means may be enveloped within confined of spine 130 or other suitable storage region within photo album 120. USB port 150 as referred to within the scope of this document (Universal Serial Bus) is an industry standard that defines the cables, connectors and protocols used for connection, communication and power supply between computers and electronic devices; thereby enabling uploading and downloading of digital date—pictures, text, sound or the like. USB port 150 is preferably located in spine 130 of photo album 120 as shown for easy access (or an alternate positioning as indicated in FIG. 4.) USB port 150 is also preferably used for charging electronic recording and video displaying device 140 (electronic recording and video displaying device 140 comprising a tablet in preferred embodiments) and/or connecting electronic recording and video displaying device 140 to at least one computer for downloading and/or uploading recorded videos 144 and/or data onto the computer. Video/audio and photo album and accessories system 110 preferably provides individuals with a convenient means by which to simultaneously view still-pictures 136 and recorded videos 144 in one event memorabilia assembly. Electronic recording and video displaying device 140 (as a tablet) can be mounted into front cover 122 with Velcro® and also be hard wired with a USB port 150 inside front cover 122 on all four sides of photo album 120.

Electronic recording and video displaying device 140 comprises camera lens 142 (and other means necessary for taking still and non-still photographs; those with ordinary skill in the art will now appreciate that upon reading this specification and by their understanding the art of photography as described herein, methods, equipment and means of still and non-still picture taking will be understood by those knowledgeable in such art), at least one display screen 146, and at least one speaker (audibilizing output means.) Speakers may be integrated into tablet or in alternate embodiments may be located in front cover 122 or other suitable positioning (such as to one side or the other.) User(s) 180 may remove electronic recording and video displaying device 140 out of front cover 122 to record or erase footage when electronic recording and video displaying device 140 is removeably-coupleable to front cover 122.

Referring now to FIG. 3 showing a perspective view illustrating video/audio and photo album and accessories system 110 used as a greeting means according to an alternate embodiment of the present invention of FIG. 1.

In this particular embodiment, video/audio and photo album and accessories system 110 may be used in conjunction with or as an alternate to gift boxes and/or gift cards 300. Gift boxes and/or gift cards 300 of video/audio and photo album and accessories system 110 may be designed to add personalized details to wrapped gifts. Still pictures 136 and recorded videos 144 preferably comprise a greeting that is sendable from a giver-sender to a recipient-receiver. The greeting may include a personalized recorded video for example which can be placed into gift boxes and/or gift cards 300. User(s) 180 may record themselves sending well-wishes and congratulatory messages, and then place the device into gift boxes and/or gift cards 300 containing a gift which is sent to a recipient (via mail or the like.)

For example, electronic recording and video displaying device 140 may be placed into gift boxes and/or gift cards 300 with rectangular cut-out 302 located on a top, central portion of gift boxes and/or gift cards 300. Gift boxes and/or gift cards 300 may be available in small or large sizes. Electronic recording and video displaying device 140 comprises securer 310 such that the greeting may be displayed on vertical surface 320 of gift boxes and/or gift cards 300. Securer 320 may comprise an adhesive, a hook and loop fastener, or a magnet for example. Electronic recording and video displaying device 140 is preferably removeably-attached to gift boxes and/or gift cards 300 so that user(s) 180 may remove electronic recording and video displaying device 140 from gift boxes and/or gift cards 300. This particular embodiment of electronic recording and video displaying device 140 may then be placed on a tables or affixed to a refrigerator via securer 320 thereby permitting recipient-receiver to see and hear their loved ones at any time.

Referring now to FIG. 4 showing a perspective view illustrating kit 440 according to an embodiment of the present invention of FIG. 1.

Recordable downloadable video audio wedding and photo album and accessories 100 may be sold as kit comprising: photo album 120; electronic recording and video displaying device 140; and at least one securer 310. Photo album 120 may comprise no (inner) pages in certain embodiments, only a front and back page (cover) (discussed and shown in FIG. 3) and comprise a greeting card. Recordable downloadable video audio wedding and photo album and accessories 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different indicia combinations, parts may be sold separately, etc., may be sufficient.

Figure 5:
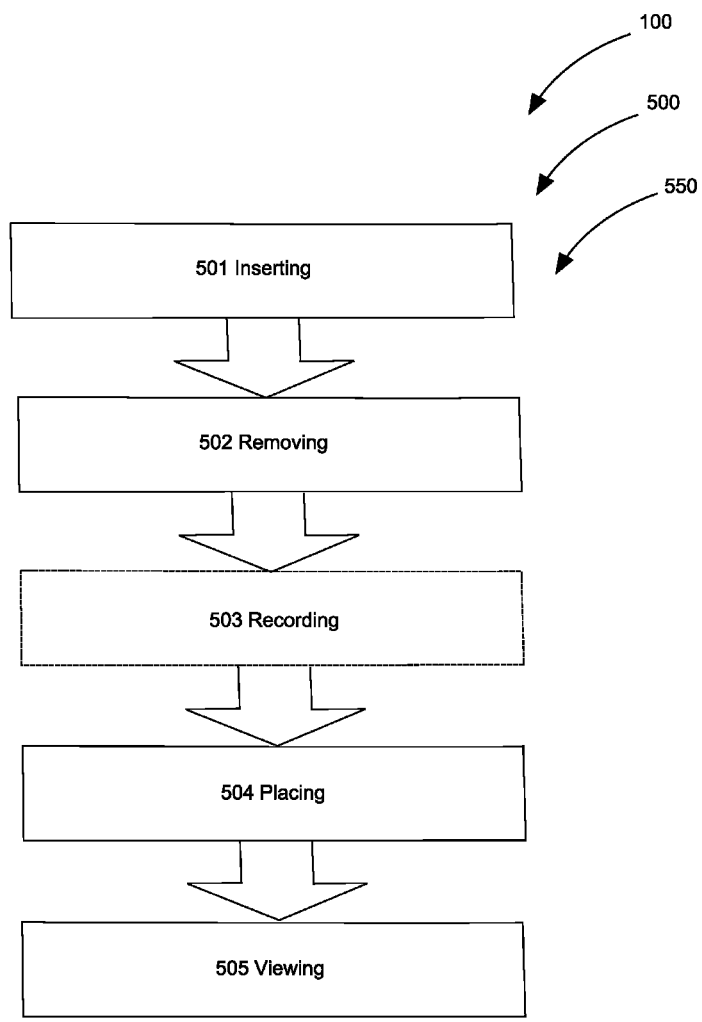
FIG. 5 is a flowchart illustrating a method of use for the video/audio and photo album and accessories system according to embodiment(s) of the present invention of FIGS. 1-4.

FIG. 5. shows flowchart 550 illustrating method of use 500 according to an embodiment of the present invention of FIGS. 1-4. Referring now to FIG. 5 showing a method (at least herein embodying method of use 500) of using video/audio and photo album and accessories system 110 preferably comprising the steps of: step one 501 inserting electronic recording and video displaying device 140 into front cover 122 of photo album 120 of an event memorabilia assembly; step two 502 removing electronic recording and video displaying device 140 from the front cover; step three 503 video and audio recording at least one event; step four 504 placing still-pictures 136 of the at least one event into still-picture-storing-pages 134; and step five 505 viewing the video and audio recording and still-pictures 134 of the at least one event at at least one future date.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A video/audio and photo album gift box system comprising:
    a) a photo album for storing a plurality of still-pictures, said photo album having a front cover, a rear cover, a spine, a personalized video/audio greeting recording, and a plurality of still-picture-storing-pages;
    b) a gift box;
    c) a removable securer;
    d) an electronic recording and video displaying device; and
    e) at least one USB port;
    f) wherein said electronic recording and video displaying device is located on a face of said front cover of said photo album;
    g) wherein said securer secures said video displaying device such that said personalized video/audio greeting may be displayed through a surface of said gift box;
    h) wherein said securer secures said video displaying device such that said personalized video/audio greeting may be removed from within said gift box and secured on a table or a refrigerator by said securer;
    i) wherein said electronic recording and video displaying device and said USB port are removably connected in electrical communication with each other;
    j) wherein said electronic recording and video displaying device and said USB port are removably connected to said photo album;
    k) wherein said electronic recording and video displaying device may be removed by finger-pushing through an aperture on back portion of said front cover;
    l) wherein said still-picture-storing-pages removably store still pictures;
    m) wherein said USB port is located in said spine of said photo album, said USB port for use in charging said electronic recording and video displaying device and/or connecting said electronic recording and video displaying device to at least one computer for downloading and/or uploading recorded videos and/or data onto said computer; and
    n) wherein said video/audio and photo album system provides individuals with a means by which to simultaneously view said plurality of still pictures and said recorded videos in one event memorabilia assembly.

2. The video/audio and photo album gift box system of claim 1 wherein said electronic recording and video displaying device is able to be permanently attached to said front cover of said photo album.

3. The video/audio and photo album gift box system of claim 1 wherein said electronic recording and video displaying device is able to be removably attached to said front cover of said photo album via fasteners.

4. The video/audio and photo album gift box system of claim 1 wherein said electronic recording and video displaying device comprises a camera lens, at least one display screen, and at least one speaker.

5. The video/audio and photo album gift box system of claim 1 wherein said electronic recording and video displaying device comprises a tablet.

6. The video/audio and photo album gift box system of claim 1 wherein said individuals may remove the electronic recording and video displaying device out of said front cover to record or erase footage.

7. The video/audio and photo album gift box system of claim 1 wherein said electronic recording device is built into the front cover.

8. The video/audio and photo album system of claim 1 wherein said still pictures and said recorded videos are of a wedding event.

9. The video/audio and photo album gift box system of claim 1 wherein said still pictures and said recorded videos are of a birthday event.

10. The video/audio and photo album gift box system of claim 1 wherein said still pictures and said recorded videos are of a graduation event.

11. The video/audio and photo album gift box system of claim 1 wherein said still pictures and said recorded videos are of a family event.

12. The video/audio and photo album gift box system of claim 1 wherein said still pictures and said recorded videos comprise a greeting.

13. The video/audio and photo album gift box system of claim 1 wherein said still pictures and said recorded videos comprise said greeting that is sendable from a giver-sender to a recipient-receiver.

14. The video/audio and photo album gift box system of claim 13 wherein said electronic recording and video displaying device comprises a securer such that said greeting may be displayed on a vertical surface.

15. The video/audio and photo album gift box system of claim 14 wherein said securer comprises an adhesive.

16. The video/audio and photo album gift box system of claim 14 wherein said securer comprises a hook and loop fastener.

17. The video/audio and photo album gift box system of claim 14 wherein said securer comprises a magnet.

18. A video/audio and photo album gift box comprising:
 a) a photo album for storing a plurality of still-pictures, said photo album having a front cover, a rear cover, a spine and at least one still-picture-storing-page;
 b) an electronic recording and video displaying device;
 c) at least one USB port; and
 d) a gift box;
 e) a securer;
 f) wherein said securer secures said video displaying device such that said personalized video/audio greeting may be displayed on a surface of said gift box;
 g) wherein said securer secures said video displaying device such that said personalized video/audio greeting may be removed from within said gift box and secured on a table or a refrigerator by said securer;
 h) wherein said still pictures and said recorded videos are of a wedding event, birthday event, graduation event, family event, and/or a greeting;
 i) wherein said electronic recording and video displaying device is located on a face of said front cover of said photo album;
 j) wherein said electronic recording and video displaying device is able to be permanently or removably attached to said front cover of said photo album;
 k) wherein said electronic recording and video displaying device may be removed by finger-pushing through an aperture on back portion of said front cover;
 l) wherein said individuals may remove the electronic recording and video displaying device out of said front cover to record or erase footage;
 m) wherein said electronic recording and video displaying device comprises a camera lens, at least one display screen, and at least one speaker;
 n) wherein said electronic recording and video displaying device comprises said securer such that said greeting may be displayed on at least one vertical surface;
 o) wherein said securer comprises an adhesive, a hook and loop fastener, and a magnet;
 p) wherein said electronic recording and video displaying device and said USB port are removably connected in electrical communication with each other;
 q) wherein said USB port is located in said spine of said photo album, said USB port for use in charging said electronic recording and video displaying device and/or connecting said electronic recording and video displaying device to at least one computer for downloading and/or uploading recorded videos and/or data onto said computer; and
 r) wherein said video/audio and photo album system provides an individuals with a means by which to simultaneously view said plurality of still pictures and said recorded videos in one event memorabilia assembly.

19. The video/audio and photo album system of claim 18 wherein said video/audio and photo album system comprises a kit including:
 a) said photo album;
 b) said electronic recording and video displaying device; and
 c) at least one said securer.

20. A method of using the video/audio and photo album gift box system of claim 1 comprising the steps of:
 a) inserting an electronic recording and video displaying device into a front cover of a photo album of an event memorabilia assembly;
 b) removing said electronic recording and video displaying device from said front cover;
 c) video and audio recording at least one event;
 d) placing still-pictures of said at least one event into still-picture-storing-pages; and
 e) viewing said video and audio recording and said still-pictures of said at least one event at at least one future date.

* * * * *